United States Patent
Ahmed

(10) Patent No.: US 6,611,536 B1
(45) Date of Patent: Aug. 26, 2003

(54) SYSTEM AND METHOD FOR INTEGRATING VOICE AND DATA ON A SINGLE RF CHANNEL

(75) Inventor: Nadeem Ahmed, Indianapolis, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/372,389

(22) Filed: Aug. 11, 1999

(51) Int. Cl.[7] .................................................. H04J 1/02
(52) U.S. Cl. ...................... 370/493; 370/336; 370/345; 370/537; 455/403
(58) Field of Search ................................. 370/493, 336, 370/347, 915, 442, 477, 528, 537, 538, 540, 913, 458–459, 533, 498, 314, 494, 495, 345, 321, 310; 455/403

(56) References Cited

U.S. PATENT DOCUMENTS

| | | | | |
|---|---|---|---|---|
| 4,813,040 A | * | 3/1989 | Futato | 370/528 |
| 5,121,385 A | * | 6/1992 | Tominaga et al. | 370/435 |
| 5,740,531 A | * | 4/1998 | Okada | 455/403 |
| 5,940,407 A | * | 8/1999 | Tamura | 370/493 |
| 6,122,271 A | * | 9/2000 | McDonald et al. | 370/345 |
| 6,393,000 B1 | * | 5/2002 | Feldman | 370/316 |

FOREIGN PATENT DOCUMENTS

| | | | | |
|---|---|---|---|---|
| WO | WO 96/09708 | * | 3/1996 | H04L/12/56 |
| WO | WO 98/57509 | * | 12/1998 | H04Q/7/30 |

OTHER PUBLICATIONS

"IBM Preps Voice Over Frames", by Tim Wilson, 194, 1W, May 31, 1999, www.informationweek.com.

* cited by examiner

Primary Examiner—Dang Ton
Assistant Examiner—Tri Phan
(74) Attorney, Agent, or Firm—Scully, Scott, Murphy & Presser; John R. Pivnichny

(57) ABSTRACT

An Integrated Voice/Data System on a Single RF Channel for broadcast applications such as Mobile Data Terminal (MDT), Automatic Vehicle Location (AVL), and mobile facsimile (fax) in the frequency region range of 450 MHz to 800 MHz on 25 kHz radio frequency (RF) channels. The system utilizes a dynamic multiplexing technique referred to as Packetized Data/Voice Dedicated (PDVD) Burst Switching, and Lookahead (a digital signal process). PDVD allows transmission of data within silence gaps inherent in speech. Lookahead provides data sources with advanced knowledge of channel(s) where the silence gaps will occur The Integrated Voice/Data System may be retrofitted into existing 450 MHz–800 MHz public and private land mobile radio channels to provide users with full data services and triples voice capacity.

18 Claims, 5 Drawing Sheets

The terminal models as an M/M/1 queue.

SYSTEM AND METHOD FOR INTEGRATING VOICE AND DATA ON A SINGLE RF CHANNEL

BACKGROUND OF THE INVENTION

1. Field of the Invention

The present invention relates generally to RF communication systems, and particularly, to a system and method for integrating voice and data on common RF channels using the same equipment in a manner which can significantly increase its flexibility and spectral efficiency.

2. Discussion of the Prior Art

Currently, many land mobile radio system provide both voice/data communication by establishing two essentially independent subsystems within each vehicle: one for voice and one for data. By dedicating separate equipment and RF channels to each type of communication, the resulting system duplicates equipment, wastes RF spectrum, and proves inflexible (because they cannot easily accommodate new types of growing mobile communication such as mobile data terminal (MDT), mobile facsimile, or automatic vehicle location (AVL); nor can they efficiently respond to changes in the mix of voice and data traffic.

For example, Mobile Data Terminals are utilized in many dispatch-related applications to allow mobile users to access remote databases. Uses include logging and tracking packages for delivery services, as well as accessing license plate and driver's license information for public safety. AVL and mobile fax applications also produce data traffic. It would be highly desirable to integrate voice and data onto common RF channels, as costs pertaining to all interactive applications may be minimized by providing highly efficient transmission facilities, rather than having separate channels for voice and data.

Further, in the broadcast environment especially for dispatch-related applications, it is often desirable for a dispatcher to be able to broadcast a request to an entire group of users, and for any member of the group to be able to either participate in the conversation or to listen to all parties involved in the conversation. For this reason, separate channels are used for uplink (mobile-to-base station) and downlink (base-to-mobile) communications. The base station may thus transmit both halves duplex of a conversation over the downlink channel without interfering with the corresponding uplink channel or transmission. The radios in the mobile units cannot simultaneously transmit and receive, thus during conversation, the mobile user depresses a push-to-talk button to switch the mobile radio from receive to transmit mode whenever the mobile user wishes to speak.

Current systems for voice/data land mobile radio must be changed to take advantage of the new technology, such as facsimile (fax), Remote Database Login, AVL, and unlimited other applications.

Because congestion within the 450 MHz–800 MHz region limits present systems' capabilities to meet the demand for increased capacity that new services require. One solution to this problem is to allocate new frequency bands, but there is high competition for new frequency allocations, and, in any case, such allocations will be at higher frequencies. High frequencies will propagate weaker signals and require more expensive equipment to enhance performance.

It would then be highly desirable to provide a voice/data communication system that utilizes the current RF frequency region (450 MHz–800 MHz) by integrating voice/data using the same RF channels in a manner so as to increase the voice capacity, and additionally providing full capacity for data communications.

SUMMARY OF THE INVENTION

The present invention is directed to a system and method for integrating voice/data on a single RF channel. Central to the system is a dynamic multiplexing technique known as Packetized Data, Voice Dedicated (PDVD) Burst Switching with Lookahead, a signal processing technique used to provide forward information of the silence gaps (speech energy gaps) in the transmitted speech.

According to the principles of the invention, there is provided a system and method for integrating data and voice on a common RF communications channel utilized for mobile radio communications, the system comprising: a means for dividing the common RF channel into at least two voice paths, each path divided into a plurality of fixed-length slots; a means for digitizing speech messages and organizing the messages into variable-length packets; a means for digitizing data messages from one or more data sources into fixed-length size packets, a packet corresponding in size to a fixed-length slot; a voice activity detector for detecting silence gaps in a digitized speech message, and communicating locations of slots in the voice path corresponding to the detected silent gaps to the data sources; and, a means for dynamically multiplexing the variable-length speech packets and fixed-length data packets in slots belonging to a voice path for transmission over the RF channel, the fixed-length data packets being embedded in said slots at locations corresponding to the detected silent gaps of the speech.

Advantageously, the Integrated Voice/Data System may be retrofitted into existing 450 and 800 MHz public and private land mobile radio channels, and compared to conventional voice-only systems, provides a tripling in voice capacity and additionally provides full capacity for data communications. Additionally, the invention provides a low cost solution to the congestion problems currently being experienced by public and private land mobile radio system users.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE INVENTION

Figure 1:
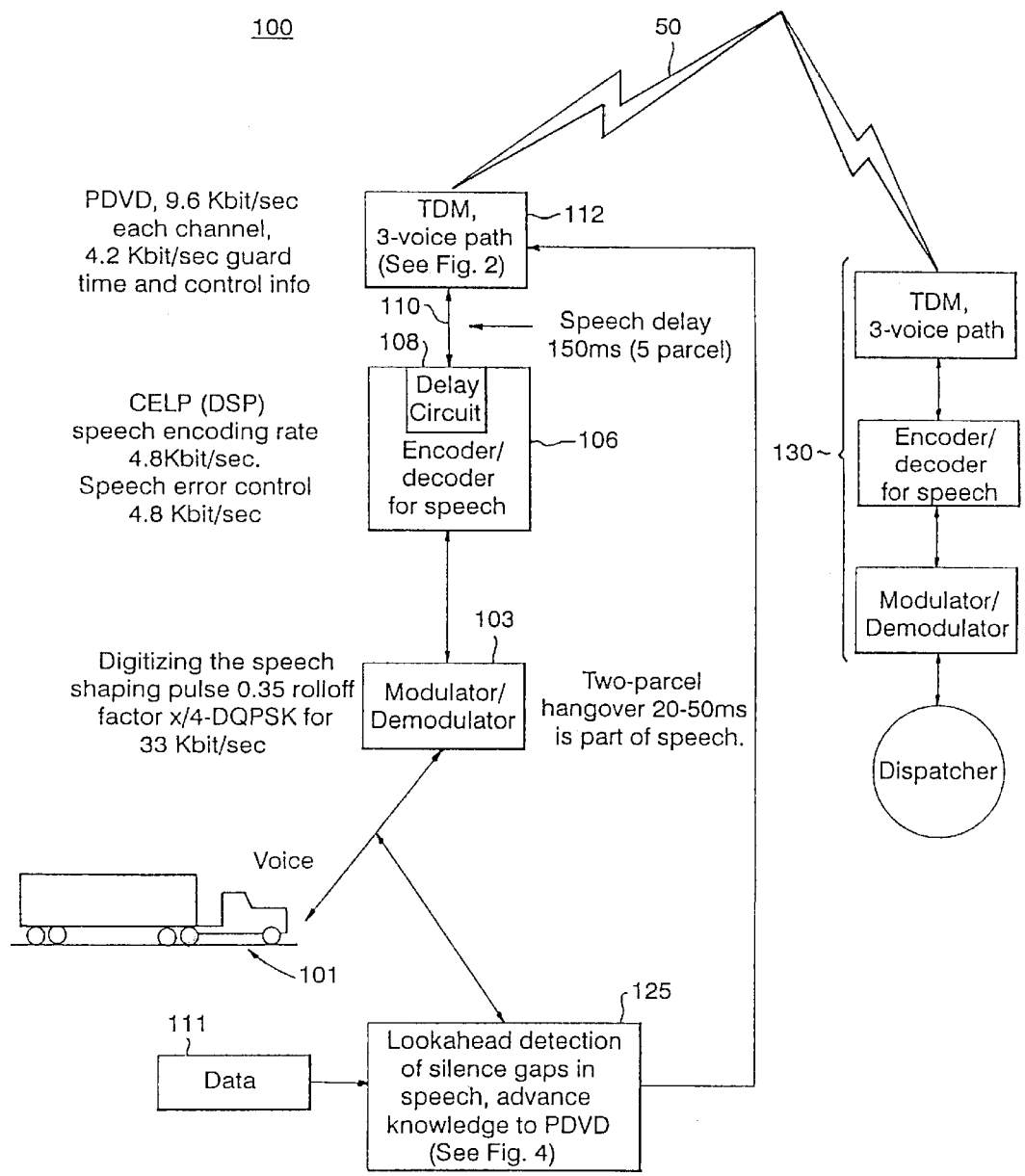
FIG. 1 is a block diagram illustrating components of the system for integrating voice and data on common RF channels.

According to the invention, one way of dynamically integrating voice and data onto common RF channels is to transmit the data during silent periods on the channel. These silent periods may be classified into three types:

1) Silence when a voice path has not been assigned to transmit a conversation, i.e., silence that occurs when the system has more voice paths available than the system's present demand requires;
2) Silence during exchanges within a conversation, i.e., during a conversation, silence that occurs during the time when one party finishes speaking and before the other party begins. Such silent period are called exchange gaps. Note that exchange gaps can also occur during group discussions; and,
3) Short silence gaps that occur during speech, i.e., when a party is speaking, the speech can be modeled as short bursts of vocal energy (talkspurts) separated by groups containing no vocal energy (silence gaps). Therefore, significant amounts of data can be transmitted even in short, inter-syllabic silence gaps.

The length of Talkspurt, i.e., a speech by one party, including his/her pauses, which is preceded and followed (with or without intervening pauses) by speech from the other party perceptible to the one producing the talkspurt, for mobile radio speech may be modeled as an exponential distribution with, for example, a 158 ms mean as set forth in equation 1) as follows:

$$f(t) = \lambda e^{-\lambda t} \quad (1)$$

where $\lambda = 6.322$ and t is expressed in seconds.

The silence gap length is represented as a function $f_s(t)$ that may be modeled as the sum of two truncated exponential functions constructed from equation (1) as follows:

$$G_1 \alpha e^{-\alpha t} + G_2 \gamma e^{-\gamma t} \quad t \leq 1.4 \text{ sec}$$

$$f_s(t) = 0 \quad t > 1.4 \text{ sec} \quad (2)$$

where $G_1 = 0.8745$, $G_2 = 0.1469$, $\alpha = 27.62$, $\gamma = 1.377$, and t is expressed in seconds. By using equation (2) (exponential distribution of equation (1)), one can find out the behavior of a periodic function or frequency (Fourier Analysis). That is, any reasonably behaved periodic function, $f_s(t)$ with period (t) can be constructed by summing a (possibly infinite) number of sines and cosines as equation (2) where $G_1$ and $G_2$ are the sine and cosine amplitude of the $n^{th}$ harmonic terms. By using the above equations (1) and (2), therefore, the talkspurt gap in speech may be calculated.

To detect silence gaps, the speech waveform must be subdivided into fixed-size parcels, e.g., 20 ms to 50 ms long. This range corresponds to the time duration over which speech may be considered stationary. Each parcel is then, based on its energy and spectral content, determined to be part of a talkspurt or part of a silence gap. Additionally, since speech often begins with weak "pickup" consonants and ends with weak "trailing" consonants, speech quality can be improved by considering the following two items to be part of the talkspurt: the last parcel of detected silence before a talkspurt; and the first parcel of detected silence after a talkspurt. This practice, is referred to as "two-parcel hang-over". Thus, the parcel size is a significant parameter in determining system performance.

FIG. 1 is a block-diagram illustrating the integrated voice/data mobile radio system 100 for a broadcast application. As shown in FIG. 1, the communication system at the comprises a mobile radio transceiver including at least the following components: a modulator/demodulator 103 device 103 for digitizing speech messages, e.g., to be broadcast from an automobile or truck 101; speech encoder/decoder device 106; and, a time division multiplexor circuit 112 for placing both data packets and voice packets onto a path of an RF channel. Other components include a delay circuit 108 for delaying digitized speech prior to multiplexing over the RF channel; and, a voice activity detector 125 for detecting silent gaps in speech messages and communicating locations of silent gaps to the data sources 111 and the multiplexer.

In the preferred embodiment, the modulator/demodulator device 103 employs a bandwidth-efficient, linear modulation technique such as the $\alpha/4$-Shifted Differential Quadrature Phase Shift Keying ($\alpha/4$-DQPSK) with raised cosine pulse shaping (e.g., 0.35 rolloff factor) that has been specified for the North American Digital Cellular System. In the mobile radio environment, this technique may achieve a 48.6 Kbit/sec transmission speed within a 30 kHz cellular channel. By selecting the same $\alpha/4$-DQPSK modulation technique, the integrated voice/data on RF system may capitalize on the economies of scale involved in producing linear amplitude and phase response ratios for the North American Digital Cellular System, and thus ensure reasonably low cost equipment.

As known, spectral limitations are stricter for RF radio than for cellular applications. For both, the difference is in channel bandwidth (25 kHz vs. 30 kHz) and in the shape of the allowable spectrum (since adjacent channels may be used within the same area, the RF spectrum requirements have steeper peek). Therefore, within a 25 kHz land mobile radio channel, the maximum allowable If transmission speed for $\alpha/4$-DQPSK with raised cosine pulse shaping and a 0.35 rolloff factor is 33 Kbit/sec.

As further shown in FIG. 1, the modulated speech generated by the modulator/demodulator device 103 is input to a speech encoder/decoder device 106. Preferably, the speech encoder/decoder employs a technique known as Low-Complexity Code Excited Linear Prediction (CELP) for speech encoding such as described in the reference to W. P. LeBlanc, B. Bhattacharya, S. A. Mahmoud, and V. Cuperman entitled "Efficient search and design procedures for robust multi-stage VQ of LPC parameters for 4 Kb/s speech coding," *IEEE Trans. Speech and Audio Processing*, October 1993, pp. 373–385 and the reference to W. P. LeBlanc, S. Hanna, and S. A. Mahmoud entitled "Performance of a low complexity CELP speech encoder under mobile channel fading conditions," in *Proc. 39th IEEE Veh. Technol. Soc. Conf.*, May 1989, pp. 647–651. Although voice and data may be integrated using analog speech, significantly greater system flexibility and security may be attained by digitizing the speech. Thus, near-toll-quality speech using the form of robust, Low-Complexity CELP at an encoding rate of 4.8 Kbit/sec is provided. Encoding and decoding the Low-Complexity CELP may be implemented via a single digital signal processor (not shown) provided as part of the encoder/decode device 106. A one-half (½) rate error control code may additionally be employed to preserve the speech quality in a mobile radio environment which experiences multipath and Rayleigh fading as described in the reference to H. Shi, P. Ho, and V. Cuperman entitled "A Combined CELP/Reed-Solomon Codec for Mobile Radio Applications," in *Proc. 42nd IEEE Veh. Technology Soc. Conf.*, May 1992, pp. 187–191.

FIG. 1 further illustrates the output 110 of the speech encoder/decoder 106 as being delayed in time, e.g., about 150 ms, which time duration is largely a design choice dictated, among other things, by the system's equipment configuration, e.g., duplex, half-duplex operation, the type of information being communicated, e.g., voice, data, and the sensitivity of the voice activity detector, as will be explained in further detail hereinafter. For example, to prevent inhibiting normal conversation, conventional full-duplex speech requires an end-to-end system delay of less than 300 ms. But a broadcast system for dispatch application's equipment configuration—the push-to-talk button and the inability of RF units to simultaneously transmit and receive—produces speech patterns more representative of half-duplex conversation, which may tolerate end-to-end system delays as long as 750 ms to 1 sec. To preserve the timing and natural rhythm of the speech, however, system delay must not fluctuate significantly during a conversation. Data transmission from Mobile Data Terminals (MDTs) does not require strict control of delay time fluctuation and may tolerate system delays of 1 sec. or longer. Although the MDT data must be accurately received, unlike speech, the longer acceptable delay means that error control for data transmission can incorporate either Forward Error Correction (FEC) or Automatic Retransmission Request (ARQ).

Figure 2:
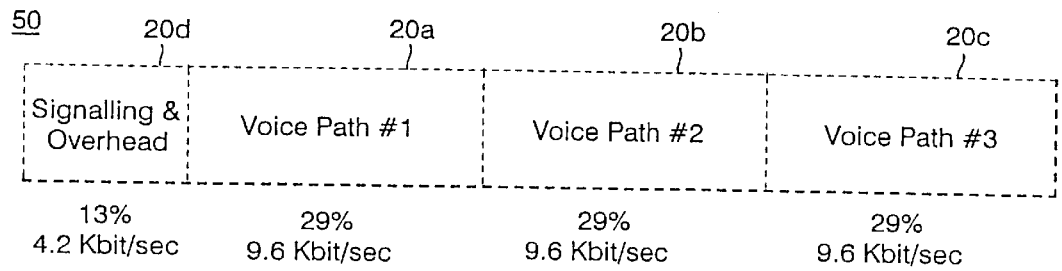
FIG. 2 is a diagram conceptually illustrating implementation of a Time Division Multiplexing (TDM) technique for embedding three voice paths onto a single RF channel.

As shown in FIGS. 1 and 2, the encoded and delayed speech message 110 is input to a Time Division Multiplexing (TDM) unit 112 which implements a static technique for embedding up to three voice paths 20a–20c onto an RF channel 50 with overhead signals 20d. As described above, a speech message requires a total encoding rate of 9.6 Kbit/sec for transmission across the RF channel (4.8 Kbit/sec for CELP and an additional 4.8 Kbit/sec for error correction). Since the α/4-DQPSK modulation technique can transmit 33 Kbit/sec across the 25 kHz RF channel, TDM is used to embed three 9.6 Kbit/sec voice paths onto the RF channel 50.

Preferably, the Time Division Multiplexing (TDM) unit 112 implements a Packetized Data, Voice Dedicated (PDVD) Burst Switching statistical multiplexing technique coupled with an uplink access control based on a concept called Lookahead for dynamically integrating voice and data onto common RF channels. Lookahead is a technique for providing data sources with advanced knowledge of channel (s) in which silence gaps will occur. For instance, on a telephone circuit, Lookahead may be determined by the voice activity detector 125 which detects the presence or absence of speech energy within the circuit.

Figure 3:
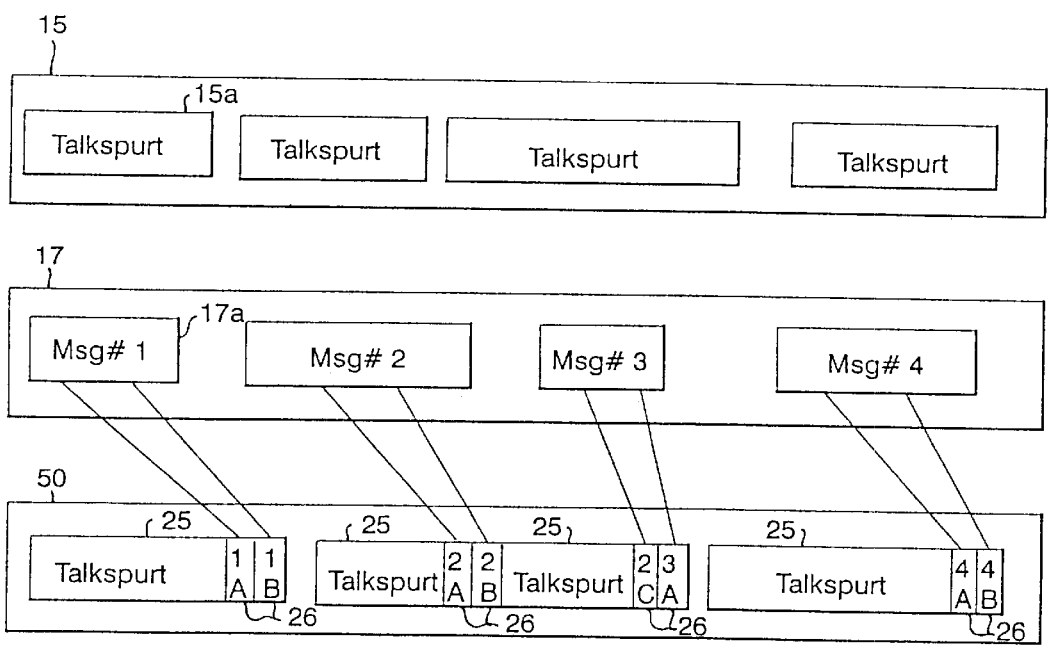
FIG. 3 illustrates the concept of PDVD Burst Switching according to the invention.

Particularly, as shown in FIG. 1 and explained in further detail with respect to FIG. 3, PDVD Burst Switching is responsible for organizing the digitized speech messages into talkspurt-sized (variable length) packets, with communication from data sources 111 being organized into smaller, fixed-length packets. Preferably, the length of the fixed data packets is set to correspond to the parcel size of a voice activity detector 125 so that the packets are sufficiently small to fit within the silence gaps in the speech.

More particularly, as shown in FIG. 3, speech messages 15 includes a series of talkspurts for communication over a single RF uplink channel. In the prior art, talkspurt messages 15a and data 17 including messages 17a, are communicated along separate paths, occupying two separate RF channels. However, according to the invention, as shown in FIG. 3, speech messages 15a are organized into talkspurt-sized bursts 25 and data messages 17 are organized into fixed length packets 26 for communication over a single path of a single RF channel 50. Preferably, the data messages are communicated sequentially, e.g., as indicated by a number and lettering scheme such as shown in FIG. 3, in time slots corresponding to detected silent gaps occurring in the original speech. Organizing speech into talkspurt-sized bursts 25 rather than into fixed-sized packets reduces the complexity associated with reconstituting the speech at the receiver. (It is understood that delay time is critical to speech). Reconstituting the multi-packet data message at a receiver, e.g., dispatch or base station 130 (FIG. 1), may be done simply by using the sequence numbering. The sequence number may be used in many different ways as would be apparent to skilled artisans. For instance: setting and resetting the counter after reaching certain bytes; on/off bit-0 for even packets and 1 for odd packets; or Sliding Windows may be used, since delay time variability are not critical for the data.

In order to simplify networking, reduce overhead, and further simplify speech reconstitution, PDVD Burst Switching incorporates a "voice dedication" feature wherein a conversation's first talkspurt establishes a path through the RF portion of the network by choosing one of the three voice paths on one of the system's uplink channels. Thereafter, all other talkspurts from the same conversation are required to use the same path (i.e., the path is like a virtual circuit). In order to ensure that a conversation's talkspurts can access the path, talkspurts from the conversations must be completed, i.e., talkspurts from other conversations are not allowed to use the same path until the original conversation is complete. However, data from any data source may be transmitted along the dedicated path during the conversation's silence gaps. Thus, PDVD Burst Switching is thus a combination of packet switching (for the data), burst switching (for the talkspurts), and circuit switching (for each conversation), since all talkspurts are routed along the same path. The voice dedication feature of PDVD Burst Switching also eliminates speech clipping, which may occur in a pure Time Assignment Speech Interpolation (TASI) system such as described in the reference to K. Bullington and J. M. Fraser entitled "Engineering Aspects of TASI,"*Bell Sys. Tech. J.*, pp. 353–364, March 1959.

Referring back to FIG. 1, for PDVD Burst Switching to be viable, data sources 111 in the system must implement the Lookahead mechanism comprising a voice activity detector 125 for sensing the silence gaps within the transmitted speech. In this technique, the voice transmissions 110 are delayed by a fixed period (e.g., five (5) parcels) to allow the transmitter to "look ahead" in the speech and pre-announce to the data sources 111 where the silence gaps on each voice path will occur. Note that the delay (150 ms, assuming 30 ms parcels) is easily tolerated in half-duplex applications (i.e., when implementing α/4-DQPSK modulation as discussed above), Furthermore, it is understood that Lookahead may occur concurrently with other system delays, such as the delay that first and second parcels may require for speech activity detection and speech encoding.

Figure 4:
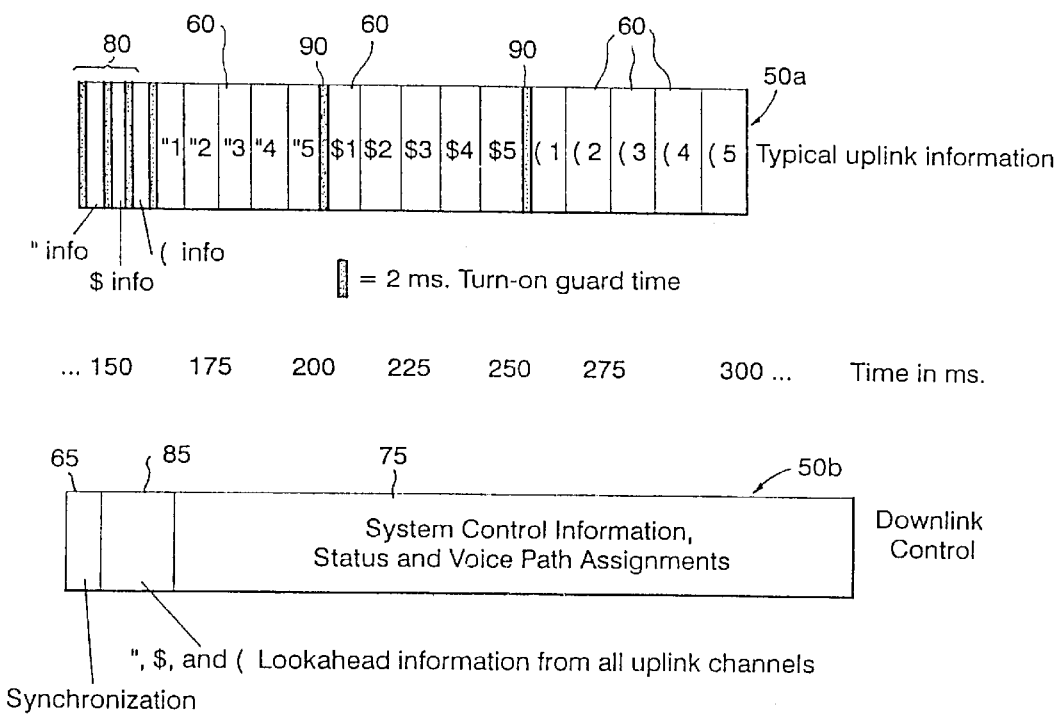
FIG. 4 illustrates the framing structure of Downlink and Uplink control channels and their timing relative to each other and to a standard uplink information channel.
Figure 5:
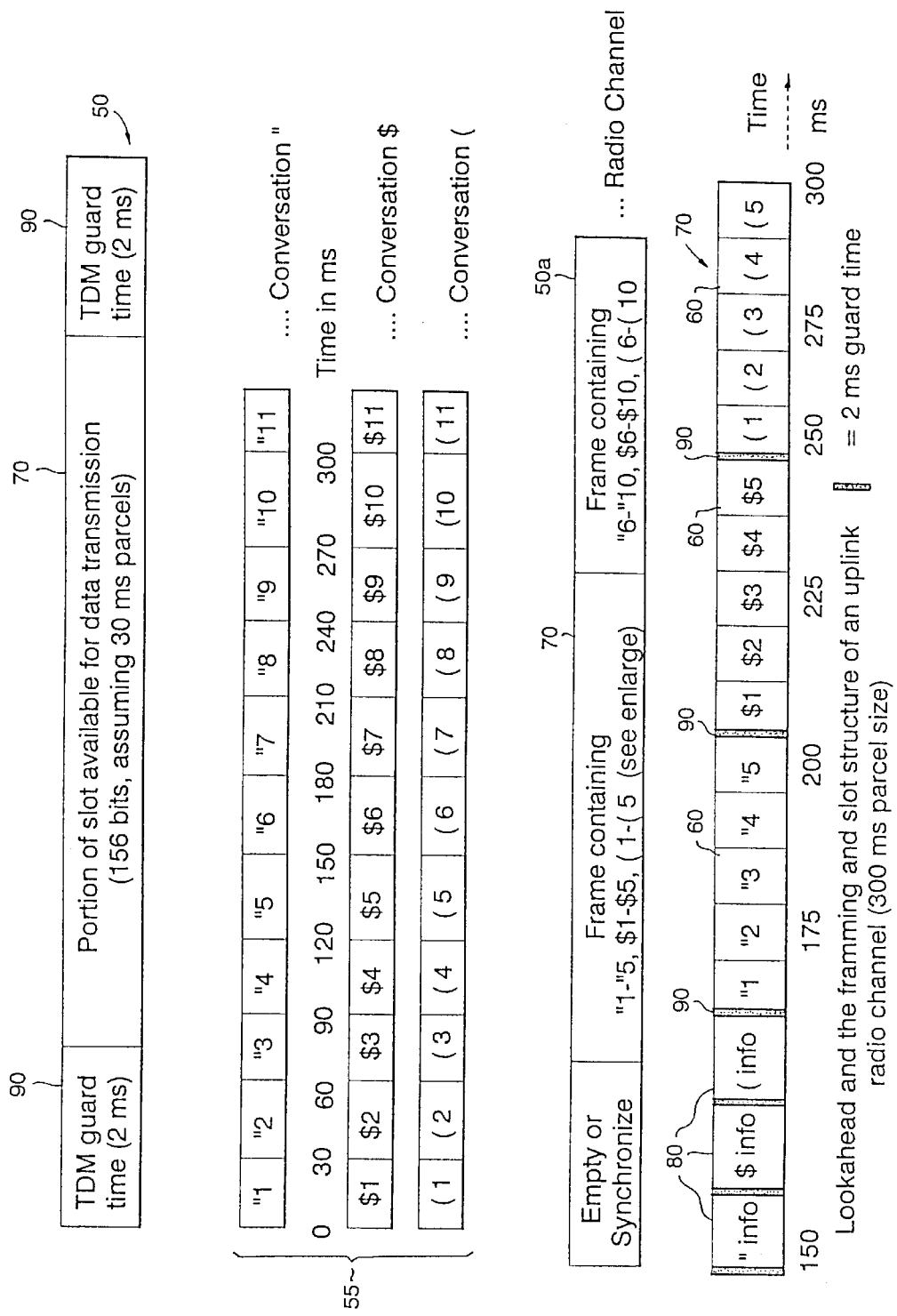
FIG. 5 illustrates the operation of the Lookahead feature of the invention.

FIG. 5 illustrates how the Lookahead feature of the invention operates and details the framing structure of an RF uplink channel 50a. As shown in FIG. 5, three conversations 55 labeled ", $, and (, are divided into fixed-size parcels, e.g., 30 ms in length as shown in relation to a time axis, that are delayed for 150 ms (five (5) parcels), and then placed together onto the 33 Kbit/sec bit stream of the RF channel 50a. The RF channel 50a is divided into frames 70, e.g., each 150 ms in length, with each frame 70 being subdivided into slots 60 (labeled "1 thru "5, $1 thru $5, and (1 thru (5 in FIG. 5), with each slot 60 capable of carrying one parcel of speech (using 30 ms parcels). Thus, each slot 60 in the RF channel is about 288 bits (8.73 ms) long. As shown in the expanded-view of frame 70, there is provided a beginning partition that contains three additional, smaller-sized slots 80 (labeled "info, $info, and (info in FIG. 4), which are used to transmit Lookahead data for the next five slots of the ", $, and ( conversation (voice) paths, plus whatever other control data is necessary. Using 30 ms parcels, each of the other information slots is 78 bits (2.363 ms) long. In FIG. 5, further included within an uplink frame 70, are TDM guard times 90, each for example of 2 ms in duration, so that power-down of a transmitter that is completing its transmission does not interfere with power-up of another transmitter that may use the next voice path. Whenever MDT data is transmitted within a slot corresponding to a silence gap, additional guard time must be included within the slot, as shown in FIG. 5 (See the above-mentioned reference entitled "Engineering Aspects of TASI,").

In addition to the group of channel pairs (information channels) used to transmit the broadcast voice and the data, two more channels (one uplink control channel and one downlink control channel) are available for transmitting system-wide Lookahead information and to handle mobile voice users' requests for access to a voice path. The composition of a downlink control channel 50b is illustrated in FIG. 4 which is shown comprising synchronization bits 65, system-wide Lookahead information 85 from uplink channel sources, and system control information, status and voice path assignments 75.

FIG. 4 further illustrates configurations of the downlink and uplink control channels 50b and their timing relative to each other and to a standard uplink information channel 50a. Particularly, the "Lookahead info" slot 85 in the downlink control channel 50b contains Lookahead information for all ", $, and ( slots in all the system's uplink information channels. To allow the processing time for the base station, the Lookahead Info slot is staggered relative to the ", $, and (info slots of an uplink information channel. As illustrated in FIG. 4, the "1 slot of each uplink information channel is nominally unavailable for data even if the slot is empty (the slot can, however, be used to transmit uplink data if the data terminal is in the same vehicle as the voice source).

All vehicles not engaged in conversations or listening to conversations within their groups will monitor the downlink control channel 50b. Vehicles involved in conversations cannot monitor the downlink control channel, so they will receive control information during the empty slots corresponding to the other two voice paths on the same information channel. Vehicles wishing to simultaneously transmit voice and data place their data packets within the silent slots produced on their assigned voice path.

For best performance and bandwidth modulation efficiency on the common RF channels for multiple users, the random access techniques like ALOHA—a TDMA (Time Division Multiple Access) transmission system developed for satellite and terrestrial radio links—and CSMA (Carrier Sense Multiple Access) represent simple solutions for the common RF channel as described in the reference to J. C. Arnbak and W. Blitterswijk entitled "Capacity of slotted ALOHA in Rayleigh-fading channels," *IEEE J. Select. Areas Commun.*, pp. 261–269, Feb 1987. Although CSMA provides better performance then ALOHA, CSMA requires every terminal to be within range of the other. As an alternative, a Multiple Access technique called BCMA (Busy Channel Multiple Access) may be implemented which technique requires all users to be within range of a central station, but not necessarily within range of each other.

Data sources contend for uplink access by using a combination of BCMA (i.e., monitoring the downlink control channel's Lookahead data to determine locations of the silent slots on all voice paths of all system channels) followed by Slotted ALOHA (contending with other data sources for the empty slots). In case of data packet collisions, each source waits a uniformly distributed random time period ranging from 0.25 to 0.6 sec., then retransmits its data (the waiting time can be based upon the channel load and the queue length on the base station, depending upon which queue process being used).

A single RF channel is primarily used to transmit data and voice for many users located within the base station's 130 range. By following the approach presented in the references to L. Kleinrock, *Queueing Systems, Volume I: Theory*. New York: Wiley,. 1975 and L. Kleinrock, *Queueing Systems, Volume II: Theory*. New York: Wiley, 1975, a Markov-Chain (exponential) model and Poisson Distribution of the traffic presented to the channel is assumed. In regard to terminals-to-base station connectivity on the RF channel, it is represented as a Markov-Chain whose STATE variable is the number of packets stored in its buffer, which operate according to a First Input First Output (FIFO) technique. The buffer length is assumed to be infinite.

Figure 6:
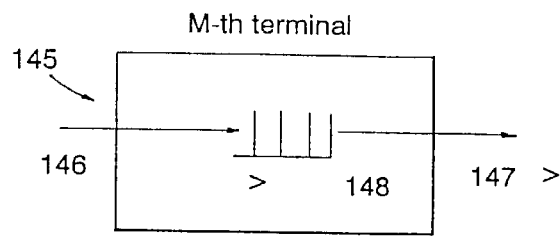
FIG. 6 illustrates implementation of a M/M/1 queue through which data sources contend for available empty slots.

Because of the high number "M" of active, identical users in the network and their mutual independence, the stochastic process representing packet input into the transmission channel may be considered as a Poisson Process. Therefore, as illustrated in FIG. 6, the system may be described as an M/M/1 queue 145, which includes an input 146, an output 147 and buffer storage slots 148. Thus, a queuing theory (e.g., M/M/1) may be used as one of the tools to analyze the network performance. The assumption of an exponential equation (1) for interarrival probability is completely reasonable for any system that has a large number of independent inputs. Under such condition, the probability of exactly "n" inputs arriving during an interval of length t time is given the Poisson equation:

$$P_n(t) = \frac{(\lambda t)^n}{n!} e^{-\lambda t}$$

where $\lambda = \mu$ is the mean arrival rate. For situations in which increasingly long service times are less likely, m/m/1 may be an adequate approximation. Thus, the probability of service finishing in some small time interval is $\mu \Delta t$, then the service-time probability function is $\mu e^{-\mu t}$ with a mean service time of $1/\mu$, sec/customer or input. The M/M/1 queue may be implemented for the integrated RF system 100 when there is exponential inter-arrival times, exponential service times, and a single sever.

Figure 7:
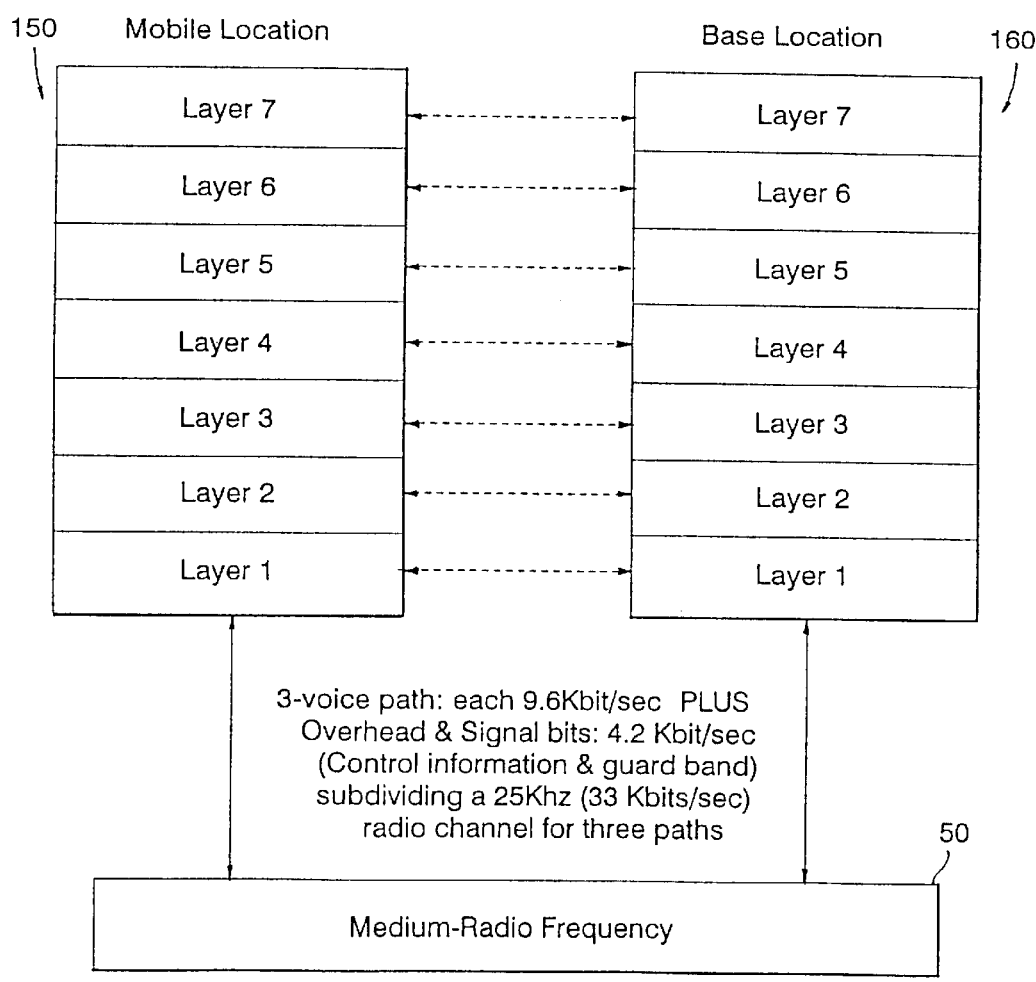
FIG. 7 is an OSI model depicting levels of communication for integrating voice and data on common RF channels system according to the invention.

FIG. 7 is an open standards interface (OSI) model depicting equipment interfaces at the mobile station 150 and base station location 160 for communicating integrated voice/data on a single RF channel 50 according to the invention. As shown in FIG. 7, at the physical Layer 1 of the protocol stack, the sending and receiving of bits is performed, while at the datalink level Layer 2, the framing, error detection/correction and the sliding windows technique for receiving and reconstituting data messages is performed. At the network level Layer 3, the statistical multiplexing and access control techniques for providing the three-voice path TDM is performed. Then, at the transport Layer 4, there is implemented the control uplink and downlink control channels. The session level Layer 5 corresponds to the implementation of techniques for performing the lookahead, PDVD and the TDM guard time slot insertion. The presentation Layer 6 corresponds to the implementation of speech encoding/decoding and RF modulation techniques; and, layer 7 corresponds to the application or user level layer.

To illustrate the integrated voice/data mobile radio system's capacity and flexibility, examples of two different dispatch-related broadcast applications with significantly different traffic characteristics (i.e., public safety and delivery services) are analyzed.

The first example relates to delivery services application with conversation initiation modeled as a Poisson Process with an average of about 3.57 conversations per vehicle per hour, and conversation length is modeled as exponentially distributed with a mean of about 16.67 seconds (using per-vehicle channel utilization statistics). The average silence between exchanges within a conversation is about 1.35 seconds, and the average conversation contains about 3.67 exchanges.

MDT data traffic statistics obtained from a major international delivery service provider assumed in this example are as follows: For the uplink channel, the average message length is 240 characters with the average message frequency being 9.0 messages/MDT/hr. For the downlink channel, average message length is 320 characters with the average message frequency being 4.5 messages/MDT/hr. Message generation is modeled as Poisson Process and length is geometrically distributed. Using a data compression technique from, MDT data can be represented using 4.14 bits per character.

In MDT there is required one control channel pair, as discussed earlier. Vehicles are uniformly distributed within a normalized circular coverage area and the effects of relative received signal strength, fading, and FM capture are considered. Error control for the MDT data with overhead is equivalent to a rate of 2/3. Forward Error Correction code may additionally be considered.

The number of vehicles within the system determines the voice and data traffic load. PDVD Burst Switching as described herein, ensures that voice conversation has higher priority over MDT data. Voice conversation PDVD Burst Switching is essentially circuit switching, and the Erlang C equation may be used to calculate the probability of blocking for voice conversations and is independent of MDT data traffic.

Table I illustrates the system performance for various traffic loads utilizing a parcel size of 50 ms (parcel size will be justified appropriately for the real-world delivery application based on the need). The rows in Table I show system performance with loads corresponding to 1%, 2%, 5%, and 10% probability of voice blocking.

uplink transmission. Messages that collide are still successfully received due to FM capture (assuming a capture margin of 6 dB). Downlink data cannot collide with other downlink data, since all such data originates at the base station where it can be scheduled.

Mean downlink delay represents the mean delay time between the base station generating a message and the vehicle receiving the message.

Mean collision % for uplink acks represents the mean % of uplink acks which were unsuccessfully received on their first transmission due to a collision with either an uplink message or with another uplink ack. Again, a 6 dB FM capture margin is assumed.

Mean uplink and downlink delay are the two parameters which most directly influence system performance. Hence, mean downlink delay is considerably less than mean uplink delay because of the base-station scheduling for MDT. Therefore, this analysis shows that a conventional voice-only mobile radio system, which uses one 25 KHz channel pair for each voice path, may be upgraded to the Integrated Voice/Data System capable of handling the full voice load and the corresponding data load for delivery applications—yet will use only ⅓ as many radio channels as the original voice-only system. Consequently, an Integrated Voice/Data System may therefore provide full data services plus triple voice capacity.

The second example relates to a public service (police mobile radio system) with conversation initiation modeled as a Poisson Process with an average of about 3.78 conversation per vehicle per hour, and conversation length is exponentially distributed with a mean of about 15.7 seconds. MDT data traffic statistics obtained from a major metropolitan police department assumed in this example are as follows: For the uplink channel (vehicle-to-base), the average message length is 27 characters with the average message frequency being 18–29 messages/MDT/hr. For the downlink channel (base-to-vehicle), average message length is 67 characters with the average message frequency being 44.01 messages/MDT/hr. Message generation is modeled as Poisson Process and length is geometrically distributed. It is noted that public safety data traffic consists of messages that are shorter and more numerous than for delivery service applications, and the distribution between uplink and downlink messages also differs considerably.

TABLE I

System Performance as a function of traffic load for delivery service application

| # of Vehicles in System | Probability of All Voice Paths Busy | Mean Uplink Delay (ms) | Mean Collision % for Uplink Message | Mean Downlink Delay (ms) | Mean Collision % for Uplink Acks |
|---|---|---|---|---|---|
| 325 | 1% | 55.68 | 6.80% | 23.61 | 2.05% |
| 357 | 2% | 58.83 | 7.40% | 24.82 | 2.30% |
| 409 | 5% | 66.57 | 8.70% | 26.45 | 3.16% |
| 457 | 10% | 76.38 | 10.49% | 28.96 | 4.03% |

The terminology used in Table I is explained below:

Mean uplink delay represents the mean delay time between a mobile data terminal generating a data message and the base station receiving the message. This delay includes the effects of collision and retransmission.

Mean collision % for uplink messages represents the mean percentage of uplink messages unsuccessfully received on their first transmission due to a collision with another The performance analysis for an Integrated Voice/Data System of the invention is based on the following design approach: Vehicles are uniformly distributed within a normalized circular coverage area and the relative effects of received signal strength, fading, and FM capture are considered. To minimize computational complexity on each vehicle and to maximize speech quality, the speech digitizing rate must be as high as the channel transmission speed.

Thus, a lower speech encoding rate would provide greater system efficiency by allowing data to be transmitted even during talkspurts via TDM. A high speed digitizing rate is a worst case assumption. Overhead for the MDT data packets is assumed to be 100%. This conservative assumption includes both packet headers and error correction (either Forward Error Correction scheme or Automatic Retransmission Request).

Table II illustrates the system performance for the example public safety application with various traffic loads. A parcel size of 35 ms is used. Note that the parcel size can be optimize based on the real-world application need.

TABLE II

System Performance as a Function of Local Traffic for Public Safety Applications

| # of Vehicles in System | Probability of All Voice Paths Busy | Mean Uplink Delay (ms) | Mean Collision % for Uplink Message | Mean Downlink Delay (ms) | Mean Collision % for Uplink Acks |
|---|---|---|---|---|---|
| 325 | 1% | 29.64 | 4.54% | 11.1 | 3.03% |
| 358 | 2% | 31.03 | 4.81% | 11.33 | 3.11% |
| 410 | 5% | 37.24 | 6.19% | 11.92 | 4.09% |
| 459 | 10% | 44.81 | 7.66% | 12.97 | 5.043% |

As with the example delivery service application, all delay values in Table II shows acceptable system performance. Again this result shows that Integrated Voice/Data System provides full data services plus tripling of voice capacity.

The performance analysis is based on the system having four information channel pairs (12 voice paths) and one control pair for Integrated Voice/Data Transmission. Each channel is a single frequency. The control channel pair does not transmit voice conversation or MDT data—its sole function is to handle requests from voice users to access one of the four single-frequency channels.

This independent control channel pair is consistent with newer public safety requirements for trunked voice-only systems and also provides shorter delay in acquiring a channel for voice communication. As mentioned above, data is transmitted only during the silence gaps in the speech (speech energy). Contention control is required to handle situations in which two different data sources desire to transmit data at the same time.

The performance analysis is based on using BCMA and Lookahead to determine when silence gaps occur, and then using Slotted ALOHA during the gaps for contention control of all uplink data. If multiple channels are available for data transmission, each data source randomly picks a channel. Thus, even if multiple channels are available, the possibility exists for uplink data from two different sources to collide. In case of collision, each source waits a random period ranging from 1 to 1.5 sec, then retransmits the data. Again, uplink and downlink may also collide, producing the same wait-and-retransmit response mentioned above. Downlink data cannot collide with other downlink data, since all such data originates at the base station and can be scheduled.

In sum, the above analyses (for both applications) may be subdivided into four components:

Framing Delay—represents the amount of time between the generation of the MDT data message and the beginning of the next slot in the radio channel's TDM subdivision.

Integration Delay—represents the amount of time the data message must wait (after framing) until all its packets have been placed in silence gaps in the speech. Integration delay is correlated with voice load.

Contention Delay—is caused by uplink data packets colliding. When a collision occurs, each affected data packet is retransmitted after a time delay, which varies randomly between 0.25 and 0.6 seconds.

Transmission Delay—is the amount of time required to transmit the data—assuming no framing delay, no integration delay, and no contention delay. Transmission delay depends on the transmission speed and overhead of the system.

Tables III and IV illustrate the breakdown of uplink data delay for the delivery service (example 1) and public safety (example 2) applications, respectively.

TABLE III

Breakdown of Uplink Data - Delivery Service Application

| # of Vehicles in System | Probability of All Voice Paths Busy | Mean Uplink Delay (ms) | BREAKDOWN OF Framing | UPLINK DELAY (MS) Integration | (MEAN VALUE) Contention |
|---|---|---|---|---|---|
| 325 | 1% | 55.68 | 8.07 | 18.71 | 28.9 |
| 357 | 2% | 58.83 | 8.07 | 19.31 | 31.45 |
| 409 | 5% | 66.57 | 8.07 | 21.52 | 36.98 |
| 457 | 10% | 76.38 | 8.07 | 23.73 | 44.58 |

TABLE IV

Breakdown of Uplink Data - Public Safety Application

| # of Vehicles in System | Probability of All Voice Paths Busy | Mean Uplink Delay (ms) | BREAKDOWN OF Framing | UPLINK DELAY (MS) Integration | (MEAN VALUE) Contention |
|---|---|---|---|---|---|
| 325 | 1% | 29.64 | 5.65 | 4.69 | 19.3 |
| 358 | 2% | 31.03 | 5.65 | 4.74 | 20.64 |
| 410 | 5% | 37.24 | 5/65 | 5/26 | 26.33 |
| 459 | 10% | 44.81 | 5.65 | 6.62 | 32.54 |

Tables III and IV illustrate show that for all loads, integration delay is more significant for the delivery service application than for public safety, because the longer data messages produce a large optimum parcel size (50 ms for delivery services and 35 ms for public safety). These parcel sizes totally depend on the type of application.

The characteristics of speech require that parcel size preferably be within the 20–50 ms range. Varying the parcel size within this range has multiple effects on system performance. Larger parcels increase the performance speed by reducing overhead. Since TDM guard times are a fixed 2 ms, the larger the slot size, the lower the percentage of the slot used for the guard times. Additionally, the longer the slot, the more likely that the data message may fit within a single slot, thus eliminating the additional overhead from reconstitution at the receiver. Larger slot sizes, however, may also slow performance. As illustrated by equation 2, a large percentage of the silence gaps are extremely short. The larger the parcel size, the more likely that the majority of the parcel consists of talkspurt fragments, thereby causing the entire parcel to be evaluated as a talkspurt.

Current trends indicates significant future growth in data traffic. For the Integrated Voice/Data Mobile Radio System, this growth may come from three different sources: 1) the addition of more vehicles to the system; 2) increasing MDT use within the vehicle; and 3) the addition of other sources and/or features to the vehicle, such as high resolution graphics or mobile facsimile.

Source 1 results in increases in both voice and data traffic to the system. The increase in voice traffic will increase the blocking probability for voice conversations, and this increase in voice blocking will either have to be tolerated or more channels will have to be added to the system. Items 2 and 3 represent an increase in data traffic relative to the voice traffic.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for integrating data and voice information on a common narrowband RF communications channel for land mobile radio frequency applications, said system comprising:

means for dividing said common narrowband RF channel into at least two voice paths, each path divided into a plurality of fixed-length slots each corresponding in size to a detectable inter-syllabic speech gap;

means for digitizing speech messages and organizing said messages into variable-length packets;

means for digitizing data messages from one or more data sources into fixed-length size packets, a packet corresponding in size to a fixed-length slot;

voice activity detector for detecting silence gaps in a digitized speech message, and communicating locations of slots in said voice path corresponding to said detected silent gaps to said data sources; and, means for dynamically multiplexing said variable-length speech packets and fixed-length data packets in slots belonging to a voice path for transmission over said narrowband RF channel, said fixed-length data packets being embedded in said slots at locations corresponding to said detected silent gaps of said speech.

2. The system as claimed in claim 1, further including means for delaying transmission of digitized speech packets onto said voice path, said delay time corresponding to a fixed multiple of parcels.

3. The system as claimed in claim 1, further including means for receiving a first digitized speech message of a conversation and establishing transmission of said first speech message and all subsequent speech messages belonging to said conversation on a same voice path.

4. The system as claimed in claim 1, wherein each said at least two voice paths is established as an uplink communication channel for communicating with a base station, each said voice path further including an associated one or more slots for communicating lookahead data comprising said detected locations of empty slots belonging to a conversation which may be filled with subsequent data packets.

5. The system as claimed in claim 4, wherein a location of said slots comprising said lookahead data is offset relative to communicated packets of an associated conversation, said offset configuration enabling said base station to process said lookahead data.

6. The system as claimed in claim 5, wherein said base station communicates a downlink control channel including information processed at said base station, said information including current voice path assignments for said narrowband RF channel, and system-wide information including location of empty slots in uplink information channels.

7. The system as claimed in claim 6, wherein a mobile user not currently engaged in conversation includes means for monitoring a downlink channel to ascertain current usage of voice paths embedded in said narrowband RF channel and to handle mobile voice users' requests for access to a voice path.

8. The system as claimed in claim 1, wherein up to three voice paths may be established for carrying data and speech over said narrowband RF channel.

9. The system as claimed in claim 1, wherein said digitizing means further includes means for encoding said speech messages, said system further including means for modulating said encoded speech messages for transmission over a voice path.

10. A method for integrating data and voice information on a common narrowband RF communications channel utilized for mobile radio communications, said method comprising the steps of:
   a) dividing said common narrowband RF channel into at least two voice paths, each path divided into a plurality of fixed-length slots each corresponding in size to a detectable inter-syllabic speech gap;
   b) digitizing speech messages and organizing said messages into variable-length packets;
   c) digitizing data messages from one or more data sources into fixed-length size packets, a packet corresponding in size to a fixed-length slot;
   d) detecting silence gaps in a digitized speech message, and communicating locations of slots in said voice path corresponding to said detected silent gaps to said data sources; and,
   e) dynamically multiplexing said variable-length speech packets and fixed-length data packets in slots belonging to a voice path for transmission over said narrowband RF channel, and embedding said fixed-length data packets in said slots at locations corresponding to said detected silent gaps of said speech.

11. The method as claimed in claim 10, further including the step of delaying transmission of digitized speech packets onto said voice path, said delay time corresponding to a fixed multiple of parcels.

12. The method as claimed in claim 10, further including the step of establishing transmission of a first speech message of a voice conversation and all subsequent speech messages belonging to said voice conversation on a same voice path.

13. The method as claimed in claim 10, further including the steps of:
   establishing an uplink communication channel for communicating each said at least two voice paths with a base station; and
   communicating lookahead data in one or more slots associated with each said voice path of said uplink channel, said lookahead data comprising said detected locations of empty slots belonging to a conversation which may be filled with subsequent data packets.

14. The method as claimed in claim 13, further including steps of:
   offsetting a location of said slots comprising said lookahead data relative to communicated speech packets of an associated conversation, said offset configuration enabling said base station to process said lookahead data.

15. The method as claimed in claim 14, communicating a downlink control channel from said base station, said downlink control channel including information processed at said base station and comprising current voice path assignments for said RF channel, and system-wide information including location of empty slots in uplink information channels.

16. The method as claimed in claim 15, further including the step of monitoring a downlink channel to ascertain current usage of voice paths embedded in said RF channel, said monitoring step enabling a mobile user not currently engaged in conversation to request access to a voice path.

17. The method as claimed in claim 1, wherein said digitizing step further includes the step of encoding said speech messages, said method further including the step of modulating said encoded speech messages for transmission over a voice path.

18. A mobile radio communication system established between a mobile and a base station operating at land mobile radio frequencies between 450 MHz and 800 MHz, said system comprising:
   means for dividing a narrowband RF communication channel into at least two voice paths, with each path divided into a plurality of fixed-length slots each corresponding in size to a detectable inter-syllabic speech gap;
   first switching means for multiplexing variable-sized packets of speech data onto slots of said one or more voice paths, said variable-sized packets corresponding to talkspurt size speech messages; and,
   second switching means for multiplexing fixed-length data packets onto slots of said one or more voice paths, said slots corresponding to locations of silence gaps detected in said speech messages, whereby said first switching means receives a first variable-size packet of a talkspurt speech message belonging to a voice conversation, and ensures that transmission of said first speech message and all subsequent speech messages belonging to said conversation are communicated over a same voice path.

* * * * *